INVENTOR.
Harold V. Bannister
BY
Shoemaker & Mattare
ATTORNEYS

Oct. 15, 1957 H. V. BANNISTER 2,809,756

CRANE

Filed Jan. 12, 1951 8 Sheets-Sheet 2

Inventor

Harold V. Bannister

By

Shoemaker & Mattare

Attorneys

Oct. 15, 1957 H. V. BANNISTER 2,809,756

CRANE

Filed Jan. 12, 1951 8 Sheets-Sheet 3

Inventor

Harold V. Bannister

By

Shoemaker & Mattare

Attorneys

Oct. 15, 1957 H. V. BANNISTER 2,809,756

CRANE

Filed Jan. 12, 1951 8 Sheets-Sheet 4

Inventor

Harold V. Bannister

By

Shoemaker & Mattare

Attorneys

Oct. 15, 1957 H. V. BANNISTER 2,809,756

CRANE

Filed Jan. 12, 1951 8 Sheets-Sheet 5

Inventor

Harold V Bannister

By

Shoemaker & Mattare

Attorneys

Oct. 15, 1957 H. V. BANNISTER 2,809,756

CRANE

Filed Jan. 12, 1951 8 Sheets-Sheet 6

Inventor

Harold V. Bannister

By

Shoemaker & Mattare

Attorneys

Inventor
Harold V. Bannister

By

Shoemaker & Mattare
Attorneys

Oct. 15, 1957 H. V. BANNISTER 2,809,756

CRANE

Filed Jan. 12, 1951 8 Sheets-Sheet 8

Inventor

Harold V. Bannister

By Shoemaker & Mattare

Attorneys

United States Patent Office 2,809,756

Patented Oct. 15, 1957

2,809,756

CRANE

Harold V. Bannister, Waverly, Iowa, assignor to Schield Bantam Company, Waverly, Iowa, a corporation of Iowa Application January 12, 1951, Serial No. 205,711

5 Claims. (Cl. 212—59)

This invention relates to cranes.

The invention more particularly relates to mobile, highly maneuverable cranes that are adapted for use by the military and which cranes are capable of being airborne—transported by cargo, or similar planes, gliders, etc.

Additionally, the type of crane that is embodied in this application is such that, as a unit, it may be readily picked up and transported by a cargo or similar plane or glider and very readily be placed in use.

In the prior art, there are various types of cranes, some of which are adapted to handle more yardage per hour than others, and this, of course, is due to the size and construction of the same. In none of the prior art cranes, however, is the construction, arrangement and correlation of the various component elements necessary to a crane such that they could be airborne—transported by air—or otherwise readily transported as a unitary machine and set into operation within a very minimum of time. As a matter of fact, these prior art cranes were never designed or intended for such purposes as for use by the military and capable of being airborne.

In order for a crane to be useful for the military, the same must meet critical conditions as to height, weight, width, length, mobility and maneuverability, all of which aspects of a crane are important to its being capable of being airborne and for readily and quickly placing the same in operation which is required and necessary under certain conditions. These conditions, etc. are all met in the present crane.

In the present invention, the necessary component and cooperative elements and adjuncts thereof are compactly and uniquely arranged and these cooperative elements and adjuncts thereof are all disposed on the so-called swing platform and this, too, includes the boom of the crane and the platform with the said component and cooperative elements and adjuncts thereof are adaptable, as a unit, to be mounted on a standard two and one-half ton, six by six ordnance truck or other such similar mobile vehicle and within a very minimum of time the entire unit can be so attached to a truck and be placed in operation. Thus, the unit with the cooperative elements and their adjuncts may be handled as a unit and associated with a mobile truck or the entire truck with the unit attached thereto may be readily airborne and quickly placed in use as is absolutely necessary under certain conditions where such a crane is needed.

Another factor which is important in connection with a crane that is capable of being transported by air and readily placed in use is that it must possess a low center of gravity and be able to travel at speeds along with a convoy wherein other types of trucks, etc. are utilized and, here again, the present invention departs from the prior art cranes in that these prior art cranes were never intended to go along with a convoy of troops and trucks in a military organization and, as a matter of fact, the prior art cranes are not capable of fitting into such a convoy of trucks and troops as they are not designed for such purposes and, furthermore, they are not of low center of gravity and not highly maneuverable as is the truck with the crane unit thereon as disclosed in the present invention.

In the present invention, the crane is so designed and improved structurally that certain component parts thereof such as the A frame being made collapsible as regards height and the boom which is rather long being made partially foldable, when not in use, do not add to the overall height of the crane. This is also the case in connection with other component elements of the crane. As aforesaid, for a crane to be practicable and capable of being airborne, it must definitely meet predetermined critical dimensions as to height, weight, width and the length, etc. and these dimensions are met in a minimum way by the construction and arrangement of the component elements as set forth in this specification.

Another feature of the present invention is the matter of counterbalancing the same and this is indeed quite important in that, where cranes such as in the prior art are used for various purposes, the same are designed so that they are counterbalanced usually by the weight and disposition of the component elements on the swing platform, but, in accomplishing this in the prior art cranes, the overall weight of same is excessive and the disposition, construction and relationship of the component elements is such as to be prohibitive as regards any practicable utilization of same by the military and where the crane is to be airborne. In the present invention, this counterbalancing of the crane is accomplished by a unique ballast containing tank that is carried by the swing platform of the crane and the ballast medium is placed in the tank when the crane is to be used and the ballast removed from the tank when the crane is airborne—transported by air—or otherwise transported. This matter of counterbalancing by filling a tank carried by the crane with a ballast medium makes it possible for the practicable utilization of the crane, whether the boom be operating over the front, back or sides of the platform, while the same is on a truck.

In addition to the foregoing features, there is provided a cab structure that is mounted on the swing platform for the protection of the operator of the crane and which cab structure is at least partly collapsible and may be readily transported by air along with the crane or removed therefrom and replaced as desired.

A typical example of a prior art crane or so-called earth moving device is disclosed in Patent 2,405,981, August 20, 1946.

In view of the foregoing, it is an object of the invention to provide a crane that can be transported by air—airborne.

Another object of the invention is to provide a crane of low center of gravity and particularly adaptable for use by the military and which crane may be readily airborne.

Another object of the invention is to provide an airborne mobile crane particularly adaptable for military purposes and which is highly maneuverable and quite effective in fitting into a convey of troops, trucks, etc. of various kinds.

Another object of the invention is to provide a unique arrangement and correlation of component elements and adjuncts thereof resulting in a unitary mobile crane structure which, as such, may be transported, airborne or otherwise, as a unit or the same combined or applied to a standard mobile truck and, as such, transported by air or otherwise as a complete unit.

Another object of the invention is to provide a crane which may be airborne or otherwise handled and transported and which includes a partially collapsible A frame and a partially foldable boom and the disposition of the cooperative component elements and adjuncts thereof in such relationship that minimum height, weight, width and length of the overall crane is attained.

Another object of the invention is to provide a highly maneuverable airborne type crane for use by the military and other similar uses which is so designed as regards height, weight, width and length that it may be readily transported by air or otherwise and immediately set into operation to perform its intended function.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings.

The invention will be more readily understood by referring to the drawings in detail wherein like reference numerals in the several figures of the drawings all denote the same parts.

Figure 1:
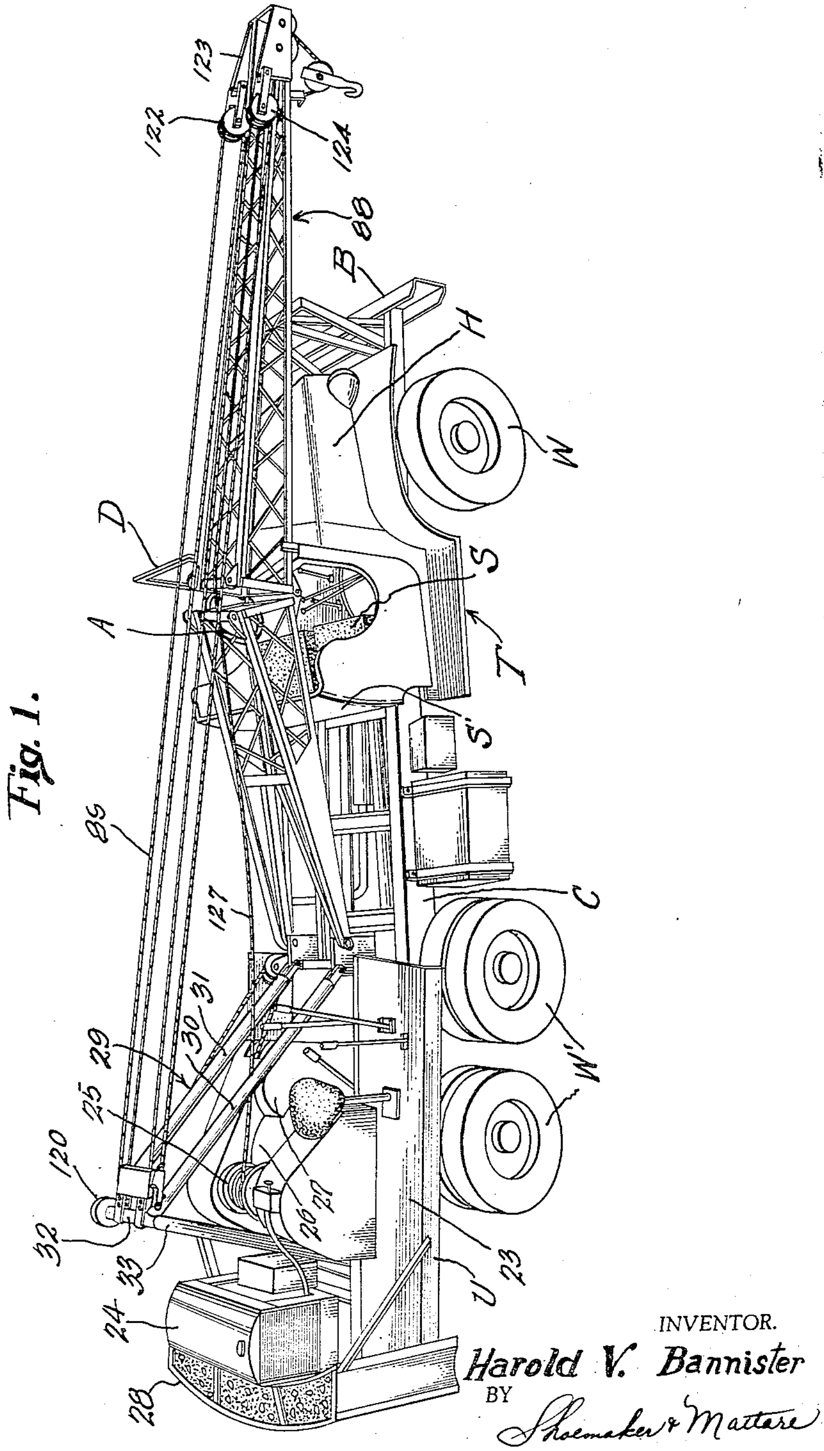
Fig. 1 is a semi-top plan perspective view of the crane with the component elements such as the A frame and the boom in their respective positions when the same is being transported or not in use and with the cab removed therefrom.

The mobile truck, which may be a standard two and one-half ton, six by six ordnance truck, or any other suitable mobile truck is generally indicated at T and includes, of course, the usual chassis C, front wheels W and dual rear wheels W′, truck seat S with back thereof S′, steering wheel A, windshield D, bumper B and, of course, motor, not shown, under the hood H, for driving the dual rear wheels W′ and the usual brake and clutch or automatic drive, as the case may be.

The crane unit is indicated generally at U and comprises a swing platform 23, motor 24 for driving the drum shaft assembly 25 and which driving mechanism is intergeared with the swing shaft assembly denoted generally at 26, and which swing shaft assembly is, in turn, intergeared with and drives boom hoist 27. The motor 24 is mounted adjacent the rear end of platform 23 and the ballast tank 28, which is preferably slightly curved in outline, is suitably and preferably permanently secured to the outer edge of the platform.

The A frame 29 comprises spaced apart non-extensible or fixed length rods or tubes forming legs 30 and 31 which are secured at their upper ends to a cross bar 32 and also secured to this cross bar are two depending collapsible or telescopic legs 33 and 34. The lower ends of the extensible and non-extensible legs of the A frame are suitably secured to the platform as described in detail hereinafter.

Suitable operating levers 35, 36, 37 and 38 are provided and these levers are suitably connected with the right and left parts of the drum assembly and the swing shaft assembly respectively. Pedals 39 and 40 are suitably connected with the right drum brake of the drum shaft assembly and the left drum brake of the drum shaft assembly respectively. These levers and pedals are conventional for the control of the operation of the crane including the boom hoist. The swing shaft assembly and the brake drum assembly include novel clutch and brake mechanisms which are also controlled and operated by the levers and pedals in a conventional manner. In addition, there is included in the operation of the crane mechanism, suitable engine clutch lever control, ignition switch, starter switch and shock control which are not shown, all being conventional.

The platform 23 includes spaced beams 41 and 42, which beams are in substantial parallelism and extend substantially throughout the length of the platform structure and are interbraced by corner struts 43 and 44 and transversely extending bracing means 45 and 46.

Figures 5, 6:
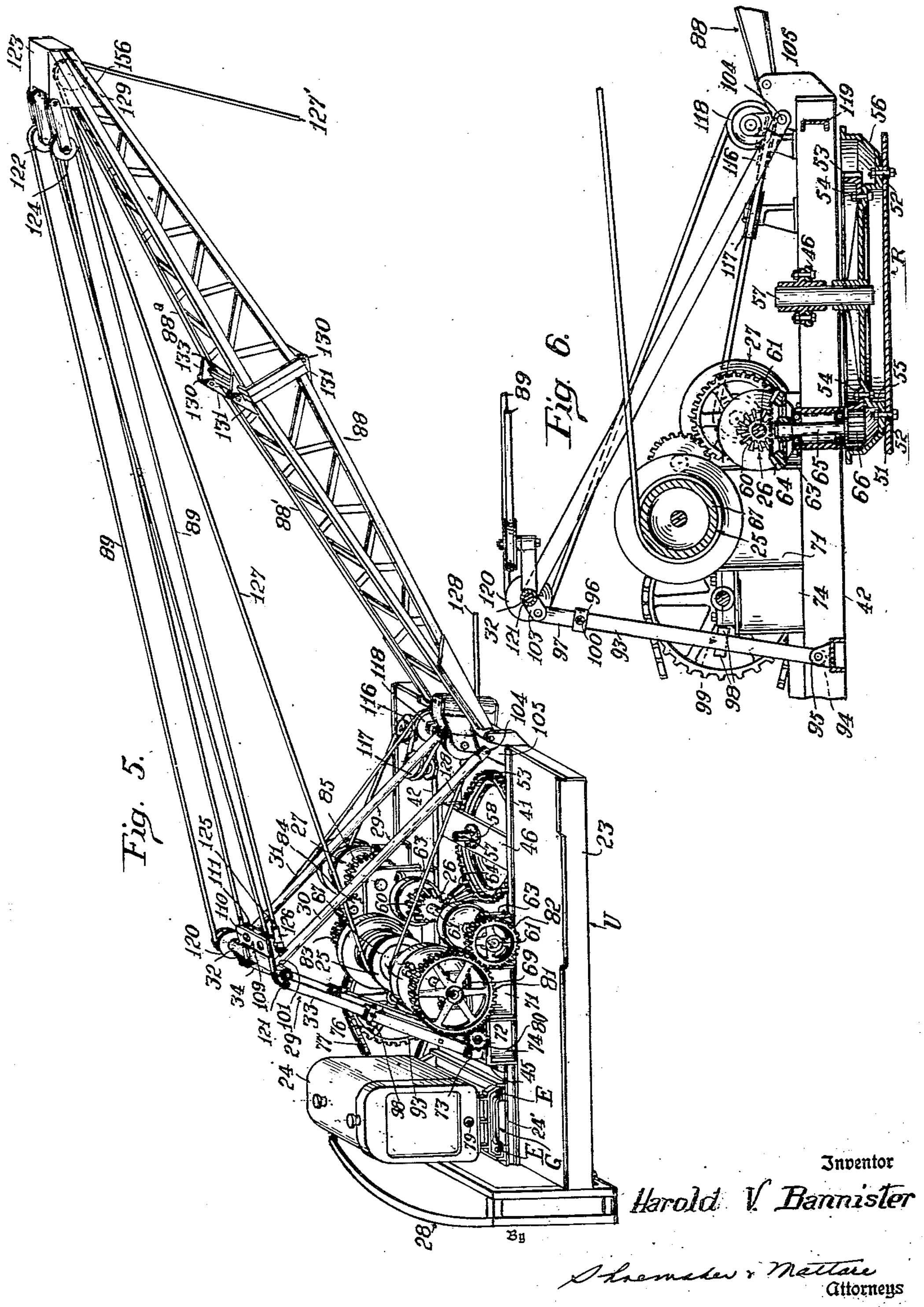
Fig. 5 is a semi-perspective view of the swing platform with the component and cooperative elements and adjuncts properly mounted and associated compactly thereon and showing the A frame in its extended position and the boom in its extended position and such positions indicating the working positions of these elements and the crane.
Fig. 6 is a longitudinal view showing certain parts in full lines and others in cross section taken substantially along the lines 6—6 of Fig. 4.
Figure 7:
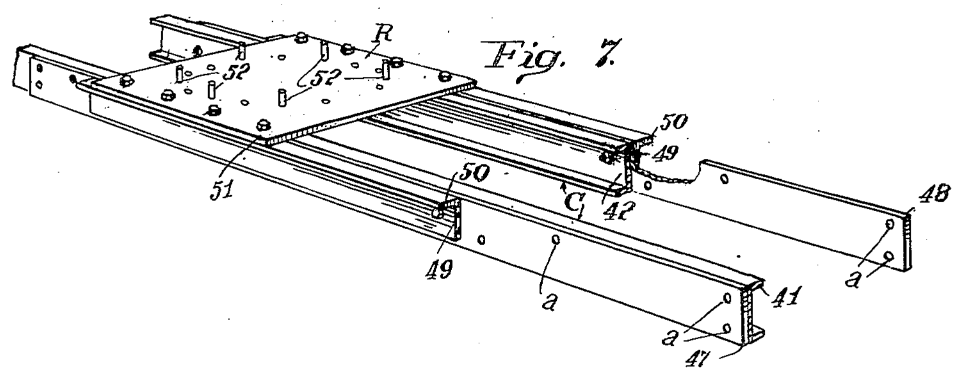
Fig. 7 is a view in perspective showing the sub-frame on which the swing platform is mounted.
Figure 8:
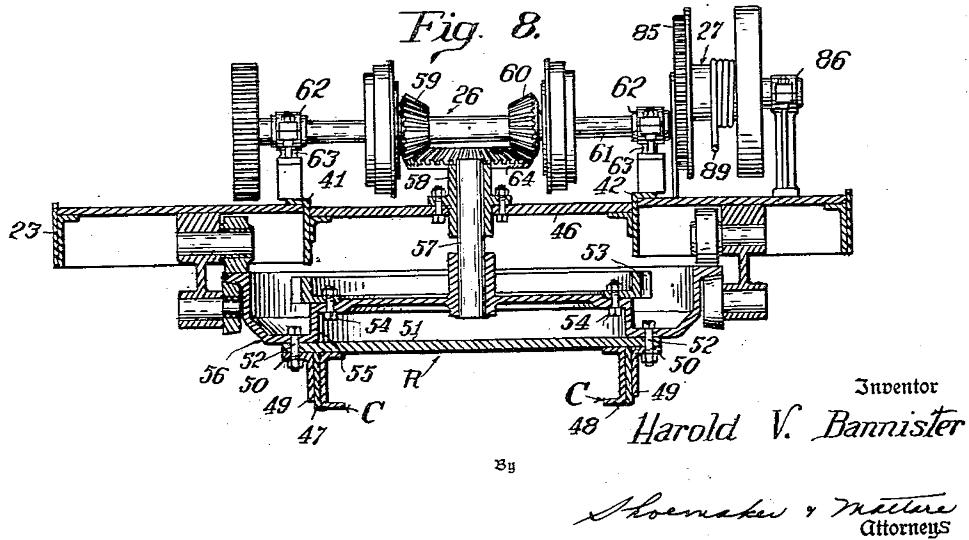
Fig. 8 is a view taken substantially along the line 8—8 of Fig. 2 looking in the direction of the arrows.

The sub-frame R of the crane unit, see Fig. 7 and Fig. 8, comprises two elongated rigid metal plates 47 and 48. Each of these plates, intermediate the ends thereof, has a similarly formed elongated angle bar bracket 49 attached thereto as by welding or otherwise, and the web 50 of each of these brackets is substantially flush with the top edge of each of the plates 47 and 48. These webs 50 serve as a support for a substantially rectangularly shaped rigid base 51 which has fixedly secured thereto, by means of a circular series of threaded bolts or the like 52 which extend through openings in the base 51, a bull gear 53 which, in turn, is secured by bolts or the like 54 to a circular flange 55 of a circular housing 56 which is concentrically disposed about this bull gear, see Fig. 6.

The aforesaid elongated plates 47 and 48 of the sub-frame R may be provided with a series of openings *a* therein and these openings in the two spaced plates are preferably in register with each other. The openings serve as a means for ready attachment of the sub-frame R and the crane mechanism that it supports, such as the platform and the component elements carried by the platform, to the chassis C of the truck or other mobile vehicle. For instance, in Fig. 8, it will be seen that the plates 47 and 48 parallel a portion of the chassis C and are in contact with and are secured thereto by means of preferably removable bolts or the like *b* or, if desired, permanent connection of the sub-frame R to the chassis of the vehicle may be had by using rivets or welding if that should be desirable. By referring to Fig. 2, it will be seen that the inner ends of the plates 47 and 48 terminate adjacent the gasoline tank K that is carried by the chassis C and is standard equipment with trucks.

A center pin 57 extends upwardly from the bull gear and casing assembly and is supported in a bracket 58, which bracket is a two-part circular one and is affixed on opposite sides to the transverse bracing strut 46. The bull gear 53 and the casing 56 are, of course, stationary.

The swing shaft assembly 26 comprises spaced beveled gears 59 and 60 on shaft 61, the ends of which shaft are journaled in similarly formed bearings 62 and these bearings are mounted on upright, oppositely disposed, similarly formed supports 63, which supports rest on and are supported by beams opposite swing platform beams 41 and 42. The beveled gears 59 and 60 are adapted to alternately drive the spur gear 64 so that when this spur gear is rotated, it likewise rotates the shaft 65 on which it is mounted and shaft 65 has secured thereon a pinion 66 which pinion, in turn, is in constant engagement with the teeth of the bull gear 53. Thus, when the gear 64 is revolved in either one direction or the other, the gear 66 being in mesh with the bull gear 53 will effect a swinging of the platform 23 throughout 360° of an arc of a circle or any part thereof and in either direction; namely clockwise or anticlockwise.

The drum shaft assembly 25 includes conventional left and right drums 67 and 68, both of which are mounted on shaft 69 and the ends of which shaft are suitably positioned and maintained in similarly formed bearings 70, and these bearings are secured to similarly formed, oppositely disposed supports 71, and these supports are also positioned on and affixed to the spaced platform beams 41 and 42. Jack shaft 72 is positioned in suitably similarly formed bearings 73 and these bearings are mounted on similarly formed supports 74, which supports are positioned on and secured to the platform beams 41 and 42. One end 75 of the jack shaft projects outwardly beyond its bearing and has secured thereto a sprocket wheel 76 of relatively large diameter and this sprocket wheel has a sprocket chain 77 trained thereover and over a smaller diametered gear 78 which is fixedly secured adjacent the outer end of the engine or motor shaft 79.

Figures 4, 9, 10:
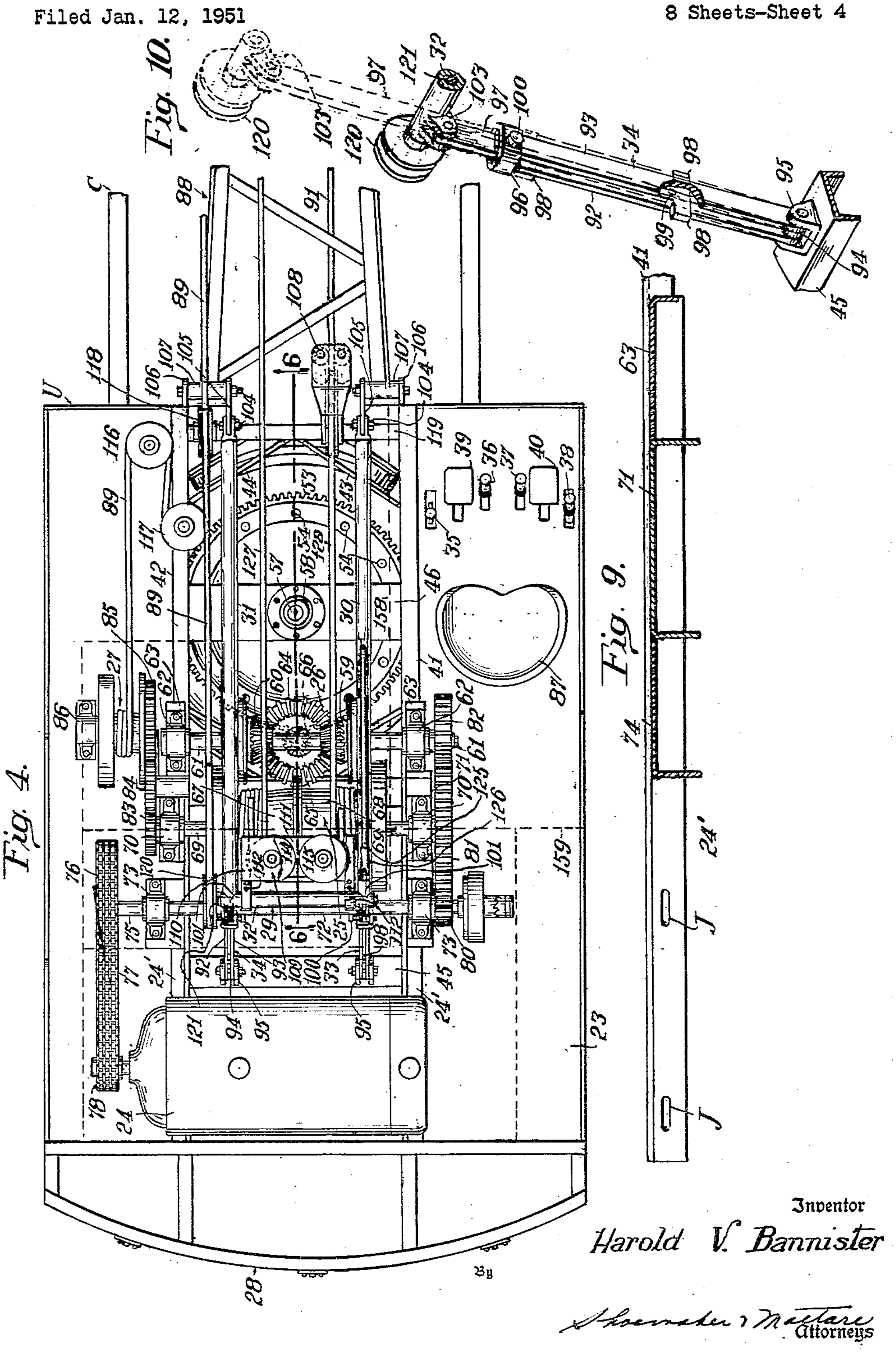
Fig. 4 is a top plan view of the crane structure and platform with the position of the cab structure indicated thereon in dotted lines.
Fig. 9 is a horizontal section taken substantially on the line 9—9 of Fig. 2 showing one of the supports that is attached to the swing platform on one side thereof for the motor, jack shaft, shaft of the winding drum assembly and the swing shaft.
Fig. 10 is a view in perspective of one of the collapsible or telescopic arms of the A frame.

The supports 63, 71 and 74 are in effect upright rigid metal plates, see Fig. 9, that are welded together where these plates abut and each of the plates has an integral right angular flange for strengthening purposes. There is a further support 24′ for the engine or motor 24 and this support is in the form of an angle iron and is provided with elongated slots J into which bolts E project and these bolts extend through legs of a frame G, which frame is a support for the engine 24, and the slots and bolts allow for an adjustment of the motor or engine 24. The engine support 24′ is welded to the support 74 and thus the individual supports 63, 71, 74 and 24′, which are all welded together, form a single unitary support but of different heights, as will be seen from Fig. 5, and this unitary support is affixed to or secured on the platform beams 41 and 42.

One end of each of the shafts 72, 69 and 61 have suitable gears 80, 81 and 82 respectively thereon, and which gears are constantly in mesh. The other end of shaft 69 has a gear 83 thereon which meshes with an idler 84 and which idler, in turn, is in mesh with gear 85, which gear 85 is one of the component parts or elements of the boom hoist 27. This boom hoist 27 is maintained on the platform 23 by means of a suitable bracket or support 86.

It will be noted from the arrangement and disposition of the motor or engine 24 and the drum assembly 25 and the swing assembly 26, that these elements are compactly arranged and disposed on and carried by the platform 23 along with the boom hoist 27. The operation of the individual elements are well known to those versed in the art but, briefly, assuming that an operator is on the platform seat 87 with the controls 35 through 38 and 39 and 40 at his disposal and under conditions where the engine, which may be an internal combustion engine, is in operation, the jack shaft 72 will be driven and through the chain of gearing constituted by gears 80, 81 and 82, the shafts 69 and 61 will be driven and if it is desired to simply raise or lower the boom 88, the proper control is operated by the operator and the boom cable 89 will be brought into operation and either wound on or payed out from the boom hoist 27 thus effecting an operation of the boom either upwardly or downwardly. Now, if the operator wishes to change the position of the platform 23 with respect to the truck or the like on which it is mounted, he will simply operate the usual controls in the conventional manner which effects a driving of either of the beveled gears 59 or 60 and a consequent swinging of the platform in any direction that he may desire, namely clockwise or anti-clockwise, and similarly, by operating the controls, the paying out of the cables 90 and 91 from or winding the cables onto the drums 67 and 68 respectively effects an operation of whatever may be attached to the boom, for instance, a clam shell, magnet pile driver, grapple, trench hoe, etc.

The collapsible or telescopic legs 33 and 34 of the A frame 29 are similarly formed and one of these legs is shown in Fig. 10. Each leg includes spaced, rigid, flat, elongated bars 92 and 93, the lower ends of which have a spacer 94 between the same and these lower ends are pivotally mounted in a U-shaped bracket 95, which bracket is welded or otherwise affixed to the cross beam 45. The upper ends of the legs 92 and 93 are welded to the interior of a rectangular collar 96 and, thus, with the spacer and the mounting of the lower ends of the bars, maintain the same in spaced relationship. A single flat bar 97 having a T end formation 98 is positioned in the space between the two bars 92 and 93 and is adapted to move therein, the T head 98 serving to prevent disengagement of the rod 97 from the rods 92 and 93. There is an opening 99 in the bar 97 adjacent the T end and this opening, when the arm is in extended position, as shown in Fig. 10 allows for a pin 100 to pass through an opening in the collar 96 and maintain the legs in the extended position and while the A frame is fully extended and in operation. However, as will be seen, when the bar 97 is lowered or telescoped between the spaced bars 92 and 93, both of the legs 33—34 of the A frame are thus collapsed and the overall height of the A frame is considerably reduced. While I have shown the flat bars 92, 93 and 97 as constituting extensible elements of the A frame, it is understood that tubularly constructed elements may be utilized and a pin or suitable fastener in an opening may be resorted to for maintaining the arms either extended or collapsed.

The complete A frame 29 is comprised of the aforesaid collapsible or telescopic legs 33—34 and the downwardly inclined rigid spaced legs 30 and 31, the latter being attached to the cross bar 32 by notching and welding the upper ends of these legs 30 and 31 as indicated at 101. The extreme upper end 102 of each of the collapsible arm bars 97 is pivotally mounted in a substantially U-shaped bracket 103 and which bracket is welded to the cross bar 32 of the A frame, see Fig. 10. The lower ends of the downwardly inclinedly extending legs 30 and 31 of the A frame 29 are each similarly pivoted at 104 to the inner portion of similar spaced brackets 105, which brackets are welded or otherwise secured to the platform structure at the front thereof. Adjacent these brackets and in alignment therewith, there are other spaced brackets 106 also secured to the platform and with brackets 105 comprise means for pivotally mounting the end 107 of the boom 88 to the platform. The usual fairlead 108 is provided at the front part of the platform between the mountings for the end of the boom.

The A frame cross bar 32 has pivotally secured thereto a sheave assembly 109. This sheave assembly consists of two elongated rectangularly shaped flat strips which are upper and lower strips 110 and 111 respectively and which strips are maintained in spaced apart relationship by the pivotal brackets 112 which are in the form of a strap iron reversely bent upon itself and the bight portion thereof serving as a pivotal mounting of the sheave assembly on the cross bar 32, and the free end portions being attached by any suitable means to the underside adjacent end portions of the strips 110 and 111. A pair of sheaves 113 and 114 are rotatably mounted in between the two strips 110 and 111 on similarly shaped pins or shafts 115. This sheave assembly 109, therefore, is adapted for pivotal movement on the cross bar 32 and carrying the sheaves with it, of course. The sheaves are in horizontally spaced relationship between the said strips, and the boom hoist cable 89 is trained over these sheaves. This boom hoist cable 89 is attached at one end to the boom of the boom hoist 27 and, as well be seen from Fig. 5, the boom hoist cable 89 is trained about staggeredly arranged sheaves 116, 117 and 118. The sheaves 116 and 117 are mounted on upstanding shafts that are affixed to the upper face of the platform and these shafts are in substantially vertical disposition whereas the sheave 118 is mounted on a horizontal axis inasmuch as this sheave is positioned adjacent one end of a reinforcing rod or bar 119 that extends between the platform beams 41 and 42. All three of these sheaves 116, 117 and 118 are idler sheaves. Thus, the boom hoist cable 89 which is secured at one end to the drum boom hoist 27 extends about the sheaves 116 and 117 that are on a substantially vertical axis and this cable then extends over the sheave 118 that is on a horizontal axis from whence it passes over a sheave 120 that is mounted on a shaft or pin 121 which is an extension of the A frame cross bar 32. Then this boom hoist cable 89 extends from the A frame sheave 120 to a pivotally mounted sheave 122 which is adjacent the point 123 of the boom 88 and thence the cable returns and is trained over the pair of sheaves 113 and 114 in the sheave assembly 109 and thence it continues forwardly to the pivotally mounted sheave 124 which is also adjacent the point of the boom, and from there the boom hoist cable 89 is returned to the A frame and is dead ended as indicated at 125 to a bracket 126 that is carried by the leg 30 of the A frame adjacent the cross bar 32.

The implement operating cables 127 and 128 are conventional and are adapted for winding upon and paying out from the winding drum assembly 25 on the two drums 67 and 68, and the cable 127 is trained over a sheave 129 adjacent the point 123 of the boom and the free depending end of this cable 127′, of course, may have any attachment applied thereto such as a clam shell, grapple, trench hoe, etc.

Figures 3, 11, 12, 13, 14:
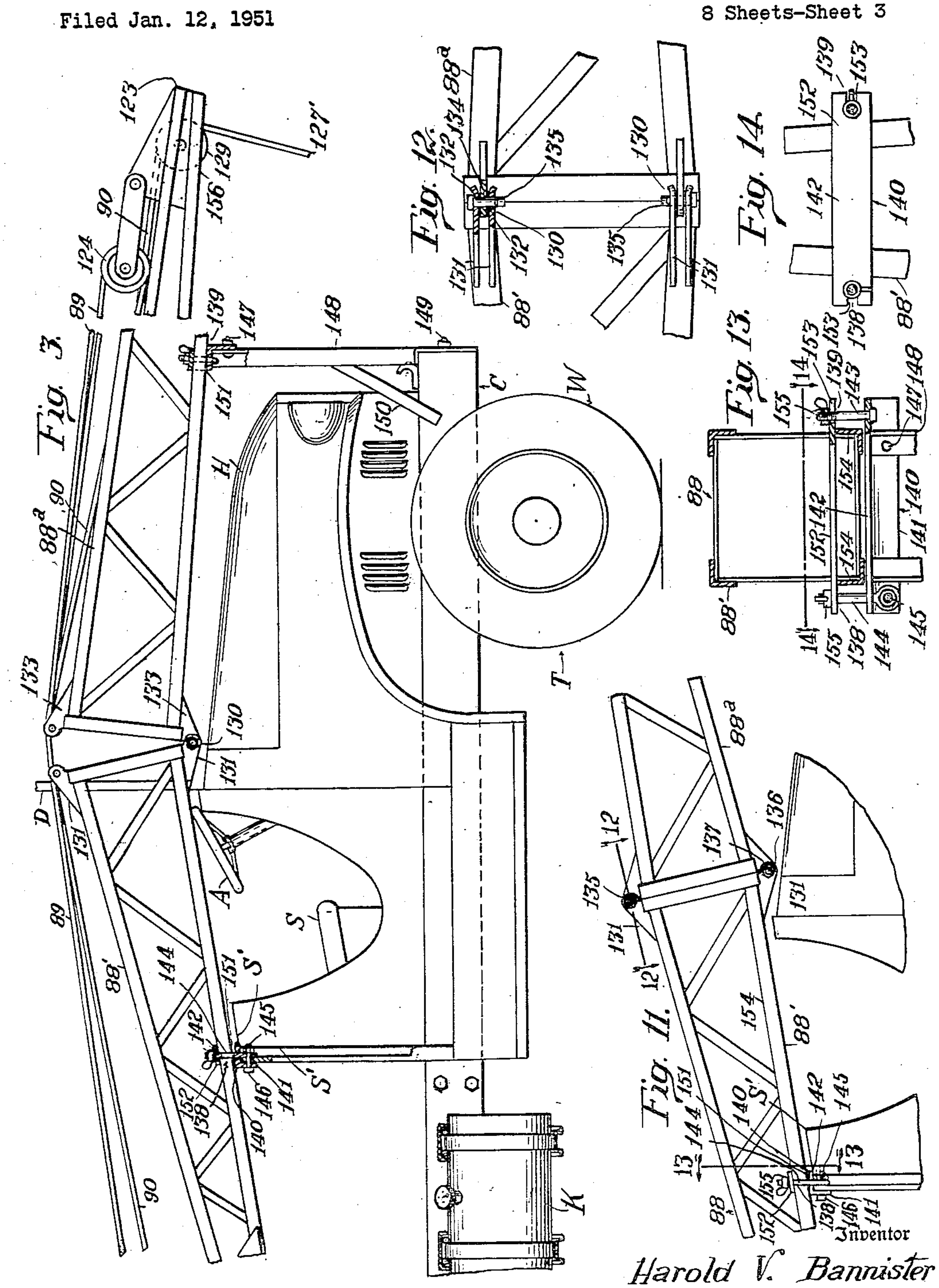
Fig. 3 is in effect a continuation of Fig. 2 and shows the forepart of the truck with the partially folded boom extending thereover and secured thereto.
Fig. 11 is a fragmentary side elevational view of a part of the boom and the detachably securing of same to the vehicle.
Fig. 12 is a top plan view substantially along the line 12—12 of Fig. 11 showing the detachable locking arrangement for sections of the boom.
Fig. 13 is a vertical sectional view taken substantially along the line 13—13 of Fig. 11, looking in the direction of the arrows.
Fig. 14 is a fragmentary elevational view taken substantially along the line 14—14 of Fig. 13.

The boom 88 is a metal fabricated type of boom and is provided substantially midway of its ends on both its upper and lower surfaces with a jointed connection indicated generally at 130. This jointed connection of the boom structure is most clearly seen in Figs. 3, 11 and 12. As will be noted particularly from Fig. 12, one of the sections 88′ of the boom is provided on its upper surface with two similarly formed upstanding spaced ears 131, each of which ears has an opening 132 therein and which openings are in horizontal alignment. The other section **88*a* of the boom has a single upstanding ear 133 which has an opening 134 therein and this opening is adapted to register with the aligned openings 132 in the ears 131 and a removable pin 135 serves to maintain the two sections 88′ and 88*a* of the boom 88 locked together but, when the pin 135 is removed, these sections slightly fold as shown in Fig. 3 of the drawings and the ears 131 and 133 separate from each other thus allowing the section 88*a* of the boom to incline downwardly and forwardly over the hood of the truck or other vehicle, and consequently maintain the minimum overall height of the crane when it is not in use such as in the position of the boom shown in Fig. 3. In referring to Fig. 11 of the drawings where the pin 135 is placed through the aforesaid registered openings, the section 88*a* of the boom, of course, will extend outwardly and upwardly whereas in Fig. 3 this section extends downwardly at an angle to the other section 88′ thereof. On the underside of the boom, opposite where the connecting ears are positioned on the top side, there is a pivotal connection 136 and this pivotal connection may be in the form of the hereinbefore described ears 131 and 133 and the pin or bolt 137 of this connection may or may not be removable but preferably is removable in the event it should become necessary or advisable to totally disassociate section 88*a* of the boom from section 88′** thereof.

In order to maintain the boom in the collapsed position as disclosed in Fig. 3 of the drawings, there are provided suitable hold downs in the form of clamps. These clamps are indicated generally at 138 and 139 and they are similarly formed so a description of one will suffice for both. By referring to Figs. 13 and 14, wherein the hold downs or clamps are disclosed, it will be seen that the same consist of a simple elongated angle iron 140 which includes vertically disposed flange 141 and a horizontally disposed flange 142. At one end of the angle iron, a threaded bolt 143 is welded to the flange 142 and may extend through an opening therein if desired and, at the other end of the angle iron, a pivoted threaded bolt 144 pivotally attached as at 145 is positioned. This bolt 144 is adapted to swing in a slot that extends from the edge of the angle iron inwardly of the horizontal flange 142. This angle iron 140 is fixedly secured to the upper edge S′ of the seat S, and at one side of the same opposite where the driver is seated, by bolts or rivets 146 and the other bracket or hold down 139 is fixedly secured by bolts, rivets or the like 147 to an upstanding rigid grill or guard 148 that is fixedly attached to the chassis C by means of bolts or rivets 149 and braced, if desired, as at 150. When the sections 88′ and **88*a* of the boom 88 are disposed on the vehicle as disclosed in Fig. 3, it will be seen that two corner portions 151 contact spaced portions of the flange 142 of the angle iron 140 and are supported thereon in both of the brackets 138 and 139. To clamp the sections 88′ and 88*a* to the seat and grill or guard respectively, the elongated, rectangularly shaped, substantially flat clamping plate 152 that is notched or slotted as at 153 at both ends thereof, is simply placed over and in contact with the opposite flanges 154 of the respective sections of the boom 88 and this clamping plate 152 is simply slipped over the rigid threaded bolt by means of the slot or notch 153 and the pivoted bolt 144 is then swung up into the slot 153 at the other end thereof and both of the wing or similar type nuts 155 are simply tightened on their respective bolts and the two sections of the boom 88** are thus firmly and securely held to the vehicle as shown in Fig. 3.

When the boom 88 is first lowered, and placed in a position where the crane is to be transported or in a condition of non use, the under portion of the section 88′ first engages the bracket 138 on the upper edge S′ of the seat S and the position of the boom at that time is as shown in Fig. 11, after which the pins 135, which may be held in the ears by means of cotter pins or the like not shown, are withdrawn from the pairs of ears 131 and 133 and then the section 88a of the boom pivots on the pivotal connection 136 and the underside portion thereof engages the bracket 139 and then the clamping plates 152 are applied as aforesaid, and the boom with both of its sections in collapsed position is firmly and securely held in the proper position for transporting by air or otherwise.

In order to set up the boom for use, the reverse procedure of that mentioned immediately hereinbefore is resorted to in that the bracket 139 would be disconnected by removing the plate 152, and then by a slight operation of winding the boom cable on the boom hoist 27, the section 88a of the boom would be brought into alignment with the section 88 as shown in Fig. 11 and then, by the simple insertion of the removable pins 135, the boom would be in an operative position or condition and then, by removing the plate from the bracket 138 and a further pull in of the boom cable 89, the entire boom 88 could be immediately and readily raised and operated by the boom hoist 27.

It will be noted that the tip portion 156 of the boom extends forwardly of the grill or support 148 at the front of the vehicle when in a collapsed position or condition.

Figure 15:
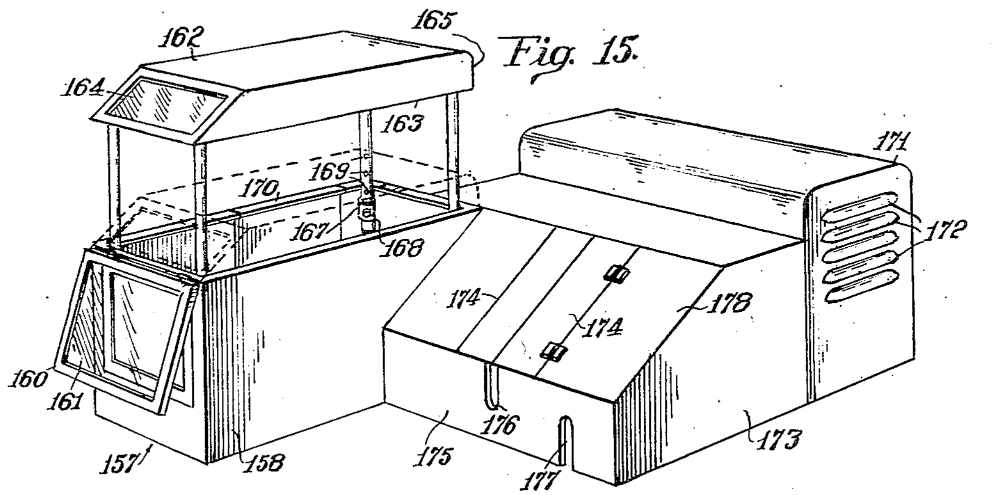
Fig. 15 is a perspective view of the crane cab.
Figure 16:
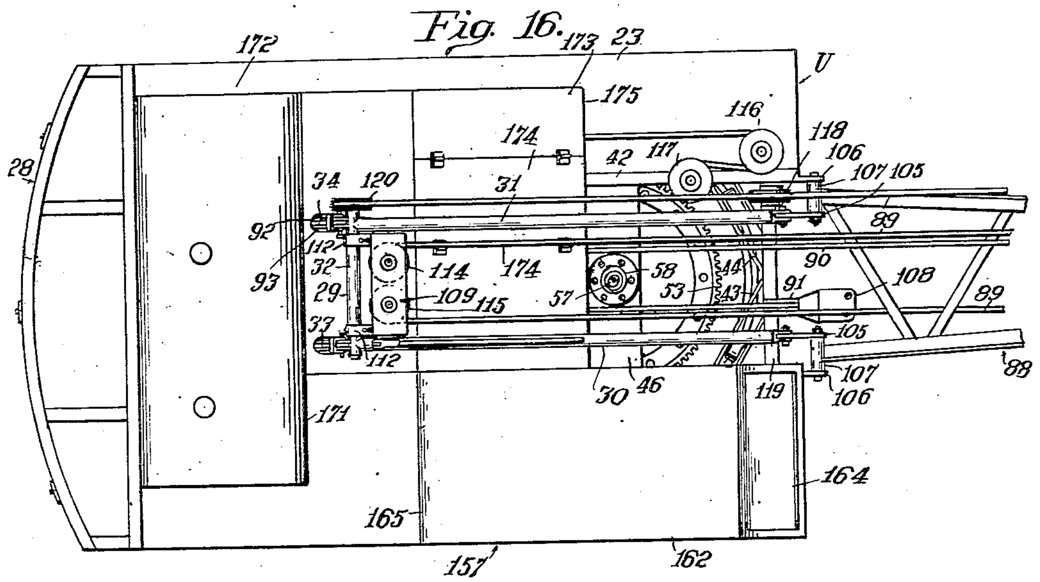
Fig. 16 is a top plan view of the swing platform with the cab structure of Fig. 15 mounted thereon.
Figure 17:
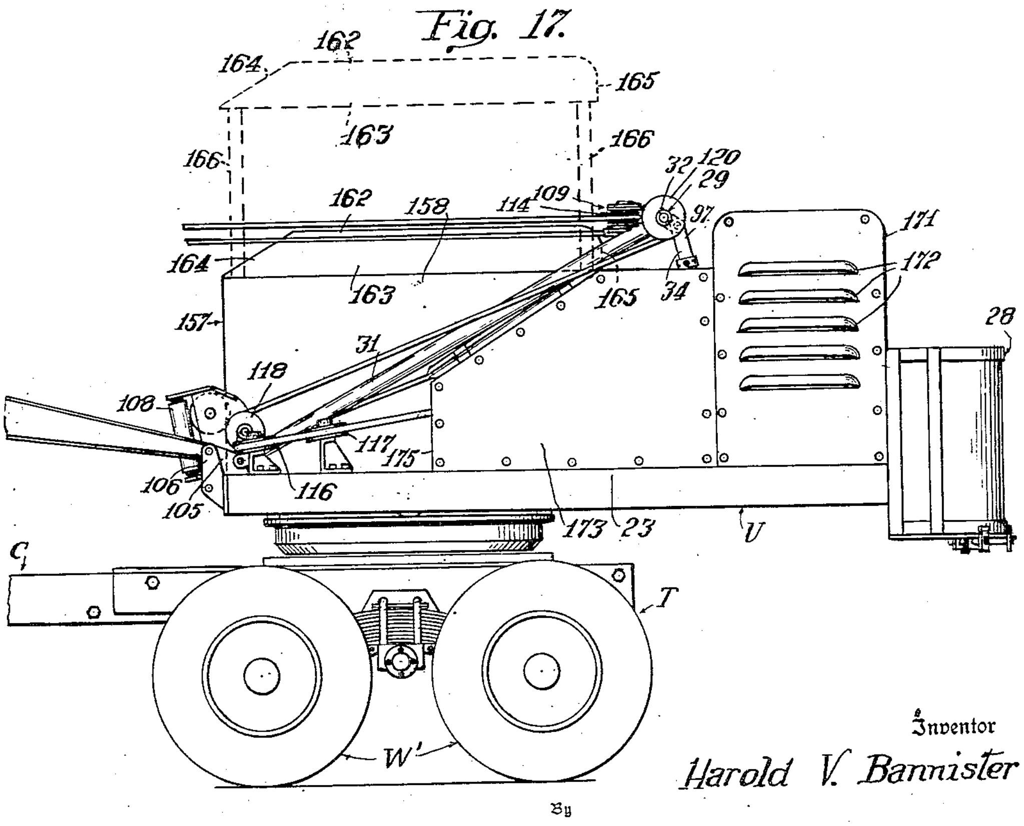
Fig. 17 is a side elevational view showing a part of the vehicle, the swing platform with the cab structure mounted thereon.

The cab structure for the crane is most clearly illustrated in Figs. 15, 16 and 17. This cab structure is preferably detachably secured to the platform by any desired brackets or other detachable connections between the same and the platform for there are occasions where it may be advisable that the entire cab structure as shown in Fig. 15 would have to be removed, particularly if servicing of any of the crane component elements were necessary or for any other reason. This cab structure is denoted generally as 157 and includes a substantially rectangular enclosure 158 that has opposite side and end walls and is preferably bottomless and this enclosure 158, as will be seen from the dotted lines 159 in Fig. 4 of the drawings, is positioned about the operator's seat 87 and the controls 35 through 40. The cab structure includes a pivotally mounted windshield 160 having a pane of transparent, preferably shatter-proof, plastic or fabric 161 therein. The top or cover of the cab 162 is substantially rectangularly shaped and is provided with depending side flanges 163 and similarly depending front and back flanges 164 and 165 respectively. Suitable rods or tubes 166 are fixedly attached inwardly of the corners of the top 162 and depend therefrom. These rods 166 slide in suitable corner brackets 167 and removable pins 168 which pass through an opening in the bracket and any one of a series of openings 169 in each of the tubes or rods serve to act as a vertical adjustment of the top of the cab relative to the base portion thereof. In order to permit the operator to get into and out of the cab, a suitable hinged or swinging door 170 is provided in one of the side walls thereof. While the top of the cab structure has been mentioned as a rigid one, it is to be kept in mind that this top of the cab structure may be of fabric of the collapsible type similar to that used in convertible automobiles. Then, too, while I have mentioned the pin that extends through the brackets and openings in the rods or tubes 166, it is to be clearly understood that suitable gearing, either manually or motor operated, could be resorted to to raise and lower the top of the cab, be it rigid or of the collapsible type, in a conventional manner.

Preferably associated with the cab structure there is an enclosure or housing 171 which extends over the motor or engine 24 and, preferably, each end of this housing 171 is louvered as at 172, and forwardly of this motor housing or casing and as an integral part thereof, there is a slightly lower leveled enclosure indicated at 173 and which enclosure preferably has inclined pivoted doors or closures 174 thereon and an extreme forward wall 175 which is provided with the elongated open ended slots 176 and 177. By referring to Fig. 17 of the drawings, it will be seen that the slots 176 and 177 serve to allow the boom hoist cable 89 to extend into and out of the front wall of the enclosure 173 and this forward part of the enclosure 173 is inclined as indicated at 178 to allow for the inclined legs 30 and 31 of the A-frame to extend thereover and without interfering therewith, see Figs. 16 and 17.

The ballast tank 28 that is secured to the rear end of the swing platform 23 is depicted in detail in Figs. 18 through 22. The rear wall 180 of the ballast tank is either curved, as shown in Fig. 1, or straight as shown in Figs. 4, 5, 18 and 19. The type of rear wall and its shape, of course, is governed by the contour or shape of the rear end of the platform 23. This tank is elongated and is preferably of substantially the same width as the width of the swing platform 23 and is attached thereto by any suitable means such as brackets, bolts or the like, not shown, and these securing means may be permanent or removable ones so that the tank can be totally detached from the swing platform, if desired, or allowed to remain fixedly attached thereto.

The ballast tank includes the rear wall 180 and a preferably curved front wall 181 and end walls 182 and 183 and all of these walls are of substantially the same height and the tank is preferably reinforced at its top 184 and ends and bottom exteriorly by angle irons 185, 186, 187, 188 and 189, which are welded or otherwise connected together. The bottom 190 of this ballast tank is preferably in the form of three separate closures or doors 191, 192 and 193, which doors are hingedly connected to the bottom edge of the back wall 180 or the angle iron positioned thereat by means of a piano type hinge 194 or ordinary individual hinges for each door. The doors are maintained in closed positions by a simple slidable bolt 195 which is maintained between suitable guides 196 that are carried by each of the doors or closures. This bolt is preferably provided with a finger piece 197 by means of which it may be readily slidable in the guides 196. When the bolt is fully projected forwardly, the extreme end 198 thereof projects through an opening 199 in keeper plate 200, it being understood that there is a keeper plate for each bolt for each closure and the same are preferably of identical construction.

In connection with the ballast tank of the type hereinbefore described, it is necessary to provide the hinged or other movable type of closure at the bottom of the same in order that the ballast therein may be readily dumped. Then, too, it is advisable in connection with such movable bottom closures for the ballast tank to provide a seal between the closure and the tank. This seal is in the form of an inverted rigid U-shaped member that forms a hollow channel opening downwardly in the extreme lower portion of the tank and this channel member is indicated generally at 201 and it is welded or otherwise secured in the bottom portion of the tank and the opening in the channel faces downwardly and the free edges of the channel member are substantially flush with the lower front, back and end walls of the tank, see Fig. 20.

Figures 18, 19, 20, 21, 22:
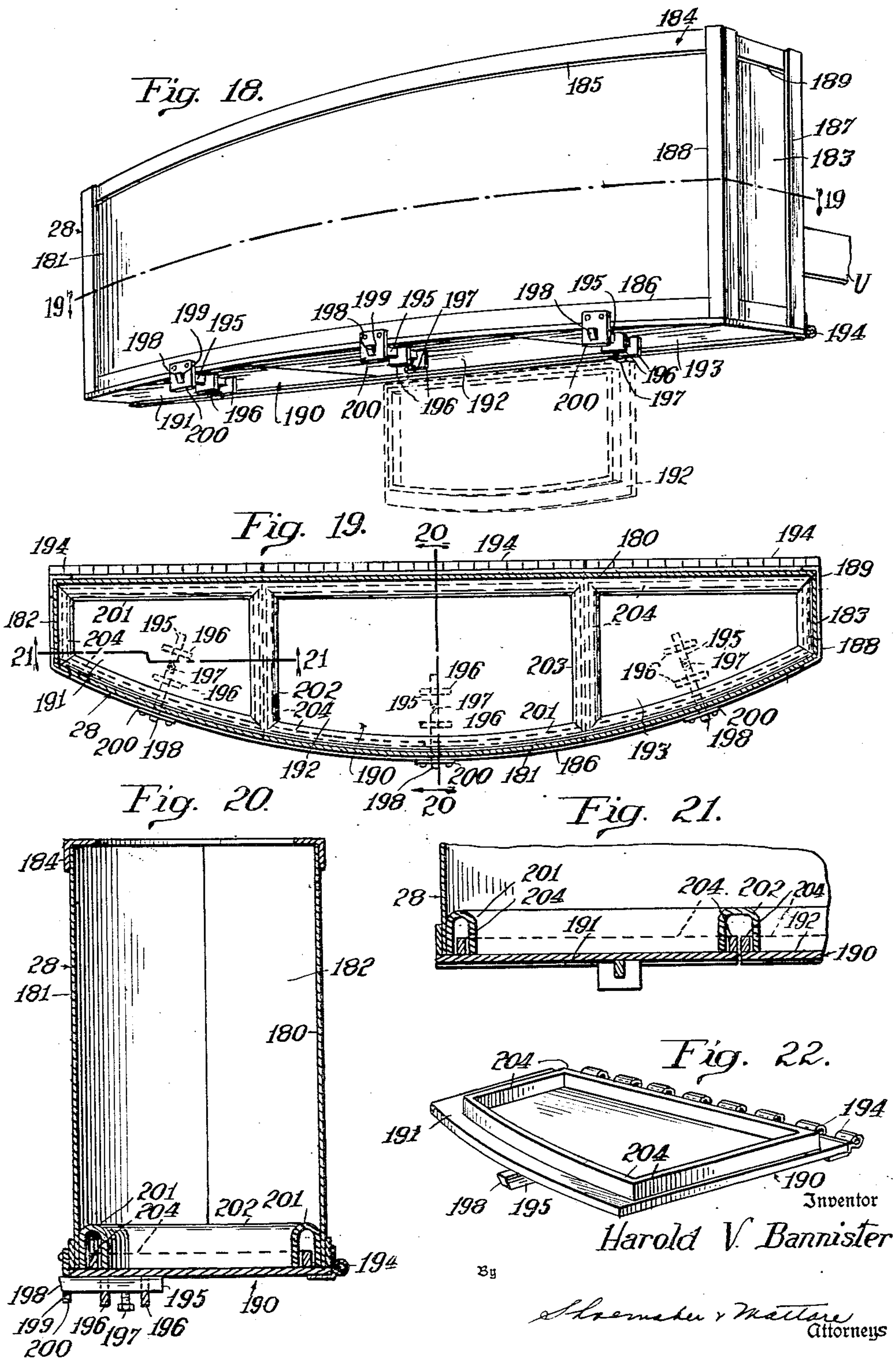
Fig. 18 is a perspective view of the counterbalancing tank that is attached to the swing platform, preferably at the rear thereof.
Fig. 19 is a longitudinal section view taken substantially about the lines 19—19 of Fig. 18.
Fig. 20 is a vertical sectional view taken substantially along the line 20—20 of Fig. 19.
Fig. 21 is a longitudinal partial sectional view taken substantially along the lines 21—21 of Fig. 19.
Fig. 22 is a detailed perspective view of the inside of one of the closures for doors for the bottom of the ballast tank shown in Fig. 18.

There are provided transversely connected inverted channel members 202 and 203 and these channel members enter into opposite channels that surround the bottom portion of the ballast tank, see Fig. 21. Each of the doors or closures on its inner face is provided with an outstanding continuous flange 204 and portions of these flanges on each door, see Figs. 20 and 21, extend respectively into the channel portions 201 in the bottom of the tank and the transversely connecting channel portions 202 and 203. Thus, as each door is provided with the outstanding flanges 204 and when the same are disposed in the channel members 201 and 202 and 203, there results a very effective sealing of the bottom of the ballast tank, even against water if such should be used as the ballast medium in the tank. If desired, of course, rubber sealing gaskets may be utilized in addition to the flanges 204 to seal against leakage of water from the ballast tank but these flanges and the aforesaid channels serve quite effectively to seal against any excessive leakage of water from the tank. Likewise, the flanges 204 on each of the closures will prevent leakage of sand or other granular ballast material from the tank. Of course, where large rocks or bags of cement or the like are used in the ballast tank, the question of leakage is not present.

The boom hoist 27 depicted herein may be made in accordance with the invention as disclosed in application Serial No. 171,082, filed June 29, 1950, entitled "Hoists."

When the boom is lowered on the truck as shown in Fig. 1 of the drawings, the overall length of the entire crane is approximately thirty feet and the maximum height is about ninety inches and the width of the swing platform is substantially equal to the maximum width of the truck at the rear thereof where the sets of wheels are positioned, and the overall weight of the entire crane is such that it may be readily airborne.

Figure 2:
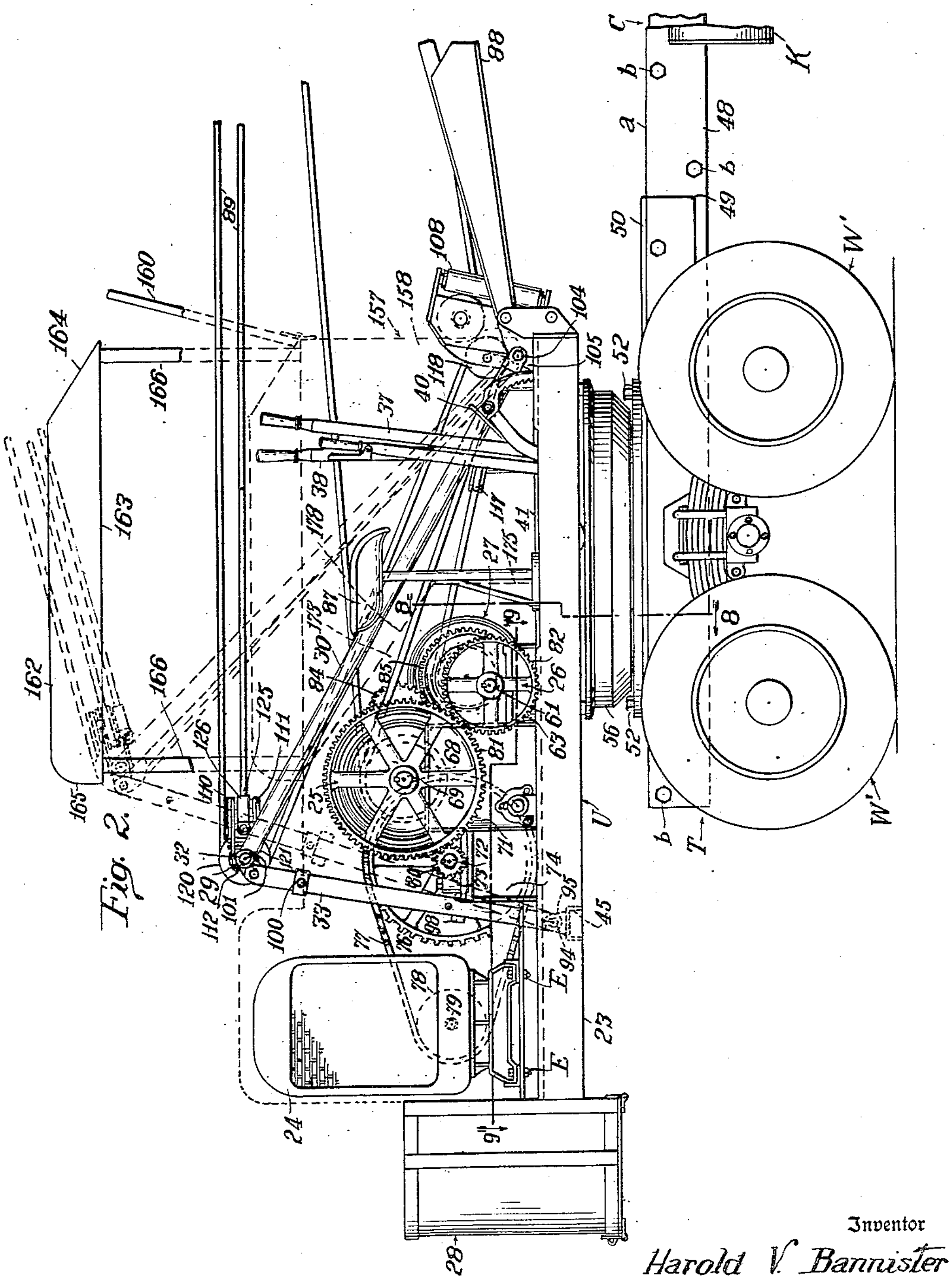
Fig. 2 is a side elevational view of the crane with the cab applied to the swing platform thereof.

The A frame 29 is shown in collapsed condition in Fig. 2 of the drawings and in dotted lines in this figure of the drawings, the same is extended. The extension of the A frame is accomplished by the operation of the boom hoist 27 through the medium of the boom hoist cable 89. Obviously, when this boom hoist is in operation, the tension on the cable 89 will effect a raising of the A-frame from the full line to the dotted line position as shown in Fig. 2 and, simultaneously, the outer end or section **88*a* of the boom 88 will be raised to the position as shown in Fig. 11 of the drawings. Thus operation of the boom hoist 27 automatically raises the A frame or extends it and unfolds the section or end 88*a*** of the boom and, by placing the pins respectively in the arms of the A frame and in the ears of the two sections of the boom, these two elements will be maintained in their operative condition.

What is claimed is:

1. A crane adapted for air transport comprising a swing platform, a boom pivotally mounted on one end of the platform for vertical swinging on a transverse horizontal axis, mechanism carried by the platform for rotating the same, implement operating cable mounting mechanism carried on the platform including a cable drum, an A-frame structure on the platform in straddling position over said mechanism and comprising a pair of fixed length legs and a pair of extensible telescopic legs, said fixed length legs being pivotally attached at one end to the platform for vertical swinging and said extensible legs being pivotally attached to the platform upon the opposite side of said mechanisms from the pivoted ends of the fixed length legs, a shaft extending across and attached to the other ends of the fixed length legs, the other ends of the extensible legs being pivotally coupled to said shaft, said cable drum being disposed laterally of one side of the A-frame structure, cable sheaves carried on said shaft, a pulley train carried on the platform adjacent to one end thereof, a pulley on the end of the shaft adjacent to the drum, and a boom hoist cable on said drum and operatively connected with the boom adjacent to the point of the latter, said hoist cable passing from the drum shaft to and through the pulley train, then to the shaft pulley and then to the boom point and sheaves whereby to apply a pull on the cable sheaves and shaft pulley from the said end of the platform for effecting raising of the A-frame and raising of the boom.

2. A collapsible crane comprising as a new combination a mobile vehicle, a swing platform mounted thereon, hoist mechanism on the platform including a hoisting drum, an A-frame on the platform in straddling relation to the hoist mechanism and including vertically telescoping leg members pivoted at their lower ends to the platform rearwardly of said mechanism and fixed length leg members pivoted at their lower ends to the platform forwardly of said mechanism, the telescoping leg members providing for vertical collapsing of the A-frame over said mechanism and to bring the fixed length legs into close proximity to said mechanism without interfering with the operation of such mechanism, a boom carried by and pivoted at one end to the forward end of the platform, all of said pivots being in substantially the same horizontal plane, said boom being partially foldable on a transversely extending pivot, cable means extending between the upper end of the A-frame, the outer end of the boom beyond said pivot and the hoisting drum to effect upon operation of the hoist mechanism the combined simultaneous actions of straightening the partly folded lowered boom, elevating the boom to a working position and elevating the A-frame to an operative condition with respect to the platform from a collapsed position by the vertical extension of the telescoped leg members and the forward and upward swinging of the fixed length leg members, counterbalance providing means carried by the platform at the rear end thereof and constructed to removably contain a ballast material, the crane when collapsed upon the supporting vehicle having transverse, vertical and longitudinal dimensions whereby the crane may be airborne.

3. The invention according to claim 2 with means for supporting the foldable boom adjacent to and rearwardly of the axis of said pivot with the portion of the boom forwardly of said axis directed at a forward and downward inclination, and the maximum elevation of the folded boom and of the A-frame when collapsed being in approximately the same horizontal plane.

4. The invention according to claim 2, with a coupling between the upper ends of the telescoping and fixed length leg members comprising a bar secured across and to the fixed length leg members, brackets secured to and projecting from the cross bar and each having an upper end portion of a telescoping leg pivotally attached thereto, and a pulley rotatably supported on the bar and having the cable means passing thereover between the said outer end of the boom and the hoisting drum.

5. The invention according to claim 2, with a pulley carried by and upon the top of the A-frame and having the cable means passing thereover between the said outer end of the boom and the hoisting drum, a cross bar forming a part of the A-frame and disposed between the upper ends of the fixed length legs and having the upper ends of the telescoping legs pivotally attached thereto, and a sheave assembly swingly carried on said bar and with which sheave assembly the said cable means is connected.

References Cited in the file of this patent

UNITED STATES PATENTS

| | | |
|---|---|---|
| 833,748 | McGiffert | Oct. 23, 1906 |
| 1,756,106 | Swenson | Apr. 29, 1930 |
| 1,817,809 | Eilersgaard | Aug. 4, 1931 |
| 1,973,136 | Atkinson | Sept. 11, 1934 |
| 1,980,297 | Scott | Nov. 13, 1934 |
| 2,083,460 | Ljungkull | June 8, 1937 |
| 2,335,858 | Huston | Dec. 7, 1943 |
| 2,348,285 | Ekbom et al. | May 9, 1944 |
| 2,368,268 | Spiegel | Jan. 30, 1945 |
| 2,374,074 | Berby et al. | Apr. 17, 1945 |
| 2,383,172 | Wagner | Aug. 21, 1945 |
| 2,383,426 | Tanenbaum | Aug. 21, 1945 |
| 2,411,305 | Taylor et al. | Nov. 19, 1946 |
| 2,445,116 | Huston | July 13, 1948 |
| 2,595,897 | Shoemaker | May 6, 1952 |
| 2,649,210 | Marchese | Aug. 18, 1953 |